(12) United States Patent
Gericke et al.

(10) Patent No.: US 8,881,528 B2
(45) Date of Patent: Nov. 11, 2014

(54) SYSTEM FOR THE GENERATION OF MECHANICAL AND/OR ELECTRICAL ENERGY

(75) Inventors: Bernd Gericke, Cologne (DE); Markus Beukenberg, Muelheim (DE)

(73) Assignee: Man Diesel & Turbo SE, Augsburg (DE)

( * ) Notice: Subject to any disclaimer, the term of this patent is extended or adjusted under 35 U.S.C. 154(b) by 489 days.

(21) Appl. No.: 13/279,487

(22) Filed: Oct. 24, 2011

(65) Prior Publication Data

US 2012/0111025 A1 May 10, 2012

(30) Foreign Application Priority Data

Oct. 22, 2010 (DE) .......................... 10 2010 042 792

(51) Int. Cl.
*F02C 1/00* (2006.01)
*F02C 6/18* (2006.01)
*F02C 1/06* (2006.01)

(52) U.S. Cl.
CPC . *F02C 6/18* (2013.01); *Y02E 10/46* (2013.01); *F02C 1/06* (2013.01)
USPC .......................................... 60/728; 60/39.182

(58) Field of Classification Search
CPC ............ F02C 7/141; F02C 7/143; F02C 6/18; Y02E 20/16; Y02E 20/18; F01K 23/10
USPC ............................................... 60/728, 39.182
See application file for complete search history.

(56) References Cited

U.S. PATENT DOCUMENTS

| | | | | |
|---|---|---|---|---|
| 3,796,045 A * | 3/1974 | Foster-Pegg | .................... | 60/772 |
| 4,896,499 A * | 1/1990 | Rice | ................................ | 60/792 |
| 5,321,944 A * | 6/1994 | Bronicki et al. | ................ | 60/775 |
| 5,557,936 A * | 9/1996 | Drnevich | ........................ | 60/649 |
| 6,058,695 A * | 5/2000 | Ranasinghe et al. | ........ | 60/39.182 |
| 6,751,959 B1 * | 6/2004 | McClanahan et al. | .......... | 60/670 |
| 6,964,168 B1 * | 11/2005 | Pierson et al. | .................. | 60/670 |
| 2002/0066265 A1 * | 6/2002 | Tsuji | .......................... | 60/39.182 |

* cited by examiner

Primary Examiner — Gerald L Sung
(74) Attorney, Agent, or Firm — Cozen O'Connor

(57) ABSTRACT

A system for the generation of energy includes a further chain of units coupled with a gas turbine plant and at least one compressor consuming mechanical energy and/or at least one generator generating electrical energy. The further chain of units comprises a closed circuit having a work fluid and at least one heat exchanger, at least one expander for expanding the work fluid and for subsequently obtaining mechanical energy for the compressor and/or generator, at least one condenser for condensing the expanded work medium, and at least one pump for conveying the work fluid. The coupling of the gas turbine plant to the further chain of units is carried out by means of the heat exchanger which is fed with heat by means of the compressor air of the compressor and starts the closed circuit through the work fluid.

22 Claims, 4 Drawing Sheets

SYSTEM FOR THE GENERATION OF MECHANICAL AND/OR ELECTRICAL ENERGY

BACKGROUND OF THE INVENTION

1. Field of the Invention

The present invention is directed to a system for increasing efficiency in the generation of mechanical and/or electrical energy in a gas turbine plant by making optimum use of the heat occurring in a gas turbine plant through incorporation of additional work-performing fluid circuits and through incorporation of solar energy in the gas turbine plant.

2. Description of the Related Art

The basic principle of a conventional gas turbine plant consists in that fresh air is compressed in an air compressor and is then burned in a combustion chamber by supplying a fuel to form a high-energy hot gas and is subsequently expanded in a work-performing manner in the turbine part of the gas turbine plant. A portion of the obtained energy is consumed to drive the air compressor and the remainder can be converted into useful electrical energy. Conversion into useful electrical energy is carried out by means of a generator for converting mechanical energy into electrical energy, which generator is connected to the turbine part of the gas turbine plant. In doing so, the turbine part is fed by the hot gas which is generated in the combustion chamber and which is under high pressure. In many practical applications, for example, in pipeline compressor stations, this hot gas which is still hot is subsequently released wastefully into the environment via the exhaust gas stack of the gas turbine plant.

Based on the growing demand for energy and the goal of appreciably reducing $CO_2$ emissions, it is necessary to increase the efficiency of plants for generation of mechanical and/or electrical energy.

Combined cycle plants comprising gas turbines and steam turbines in which the advantageous characteristics of the gas turbine plant are joined with those of the steam turbine plant have been known for many years in the prior art for increasing total efficiency. Gas turbine plants and steam turbine plants in which solar energy is incorporated have also been known for some years. Depending on the layout of the plants, widely varying parameters of work media and the associated loading of the respective plant components must be taken into account, and the respective use of solar input of solar energy can accordingly lead to elaborate and therefore costly concepts.

Previous solar energy plants built on a large industrial scale are based on what is known as parabolic trough technology in which the solar energy is coupled into the conventional steam power process by thermal oil circuits; but only relatively low process efficiencies can be achieved due to the relatively low upper process temperature.

By bundling solar energy by means of heliostats in a solar tower, the upper process temperature can be increased appreciably approximately 950° C. so that the process efficiencies achieved in combined gas/steam turbines are higher than in parabolic mirror technologies. However, the investment costs are very high; moreover, sites in areas with severe water shortages and high solar radiation suggest the necessity of developing other systems.

In the combined cycle plants mentioned above, higher efficiencies can only be achieved by means of high exhaust gas temperatures in the gas turbine plants and, for reasons relating to thermodynamics, this requires a high input temperature in the turbine part of the gas turbine plant and a corresponding optimum pressure ratio of the compressed combustion air generated in the compressor part of the gas turbine plant. The high thermal loads on the blading in the turbine part of the gas turbine plant which then inevitably result from this require correspondingly high amounts of cooling air which are generally withdrawn downstream of the air compressor and, therefore, lead to a significant reduction in overall efficiency.

While the input temperatures in the gas turbine plant have a decisive influence on the level of electric power of the gas turbine plant, the pressure or pressure ratio of the gas turbine plant at the output of the compressor part of the gas turbine plant determines the efficiency.

Accordingly, it is an object of the present invention to provide a system for a noticeably more efficient total plant for achieving a higher work output for generating mechanical and/or electrical energy while at the same time mitigating the above-mentioned disadvantages.

SUMMARY OF THE INVENTION

This object is met by a system for generation of mechanical and/or electrical energy by providing additional mechanical power by means of a closed work fluid circuit coupled with a gas turbine plant.

The total system according to the present invention is based on a gas turbine plant having low exhaust gas temperature and, therefore, also lower input temperature in the turbine part and high-temperature combustion air generated through the compressor part high pressure at the output of the compressor part of the gas turbine plant for the combustion chamber so that particularly the high thermal loading of the blading in the turbine part is appreciably reduced and the amount of cooling air needing to be removed from the compressor part is correspondingly reduced and the efficiency of the gas turbine plant is accordingly improved. The gas turbine plant which is operated at a low exhaust gas temperature is now especially well suited for incorporating a low boiling point, work-performing work fluid circuit on the one hand and optionally for additionally incorporating solar energy on the other hand so that the requirement for additional fossil energy for optimal operation of the gas turbine plant can be kept very low. Ideally, the additional fossil energy can be entirely dispensed with.

Accordingly, the total system according to the present invention comprises a work fluid circuit coupled with a gas turbine plant so that additional mechanical output can be achieved to further increase efficiency.

A closed work fluid circuit comprises a waste-heat heat exchanger for heating a work fluid, a work fluid pump, a bypass valve for an expander, an expander for expanding the work fluid and for obtaining mechanical energy, and a condenser for condensing the expanded work fluid.

Coupling of the closed work fluid circuit with the compressor part of the gas turbine is carried out by means of a heat exchanger so that the compressor air heat causes an increase in the temperature and pressure of the work fluid and starts the system.

An essential aspect of the present invention consists in that the coupling of the closed work fluid circuit can also be carried out at relatively low temperatures of the compressor air heat; this is made possible by the low boiling temperature of the work fluid of the incorporated closed circuit. In this way, the above-mentioned disadvantages of high input temperatures in gas turbine plants are avoided so that the amounts of cooling air required for the blading in the turbine part of the gas turbine plant are considerably reduced. When the arrangement according to the present invention is implemented, the points of withdrawal for the amounts of cooling air which are usually at the outlet of the compressor part of the gas turbine plant can also take place following the input of the work fluid circuit downstream of the heat exchanger which will be described in the following so that the amounts of cooling air can be reduced even further because the temperature of the air of the compressor is then already further reduced.

Within the framework of the gas turbine plant, known per se, the compressor air heat serves to supply the gas turbine combustion chamber with heated air under increased pressure so that, after the latter is cooled in the heat exchanger coupled with the closed work fluid circuit, heating is carried out again by means of a heat exchanger which is fed by the waste heat from the gas turbine.

If the temperature of the gas turbine waste heat following the above-mentioned heat exchanger is too high for reasons pertaining to layout, the temperature of the exhaust heat released in a chimney can be reduced by coupling with an additional closed low-pressure LP circuit, and this LP circuit can be combined with the above-described work fluid circuit, i.e., high-pressure HP circuit.

Accordingly, on the one hand, there is a HP circuit which is started by the waste heat side of the compressor part of the gas turbine and whose work fluid is initially fed to a HP expander and, downstream thereof, to a LP expander and, on the other hand, there is a LP work fluid circuit which is started by the waste heat from the turbine part of the gas turbine but whose work fluid feeds the LP expander exclusively.

Aside from the coupling of the gas turbine plant with the work fluid circuit, the arrangement according to the present invention is additionally coupled with a solar heating device according to another aspect of the present invention, the latter are combined with one another and represent a further development of the efficiency-optimized total system.

The gas turbine plant coupled with the solar heating device has a compressor part for compressing a gas and a turbine part for converting the entropy of the compressor air into mechanical power. A solar heating device, which generally comprises one or more solar heaters for heating the compressor air, is arranged between the compressor part and the turbine part of the gas turbine plant.

Under unfavorable conditions, particularly when overcast or at night, the gas can be heated by the solar heating device only to a limited extent. In order to prevent this loss of energy, regulating devices are provided and the solar heating device can be bypassed entirely or partially, as necessary, so that it is also possible for the gas to be conducted from the compressor part to the turbine part via a fossil-fueled combustion chamber hybridization without flowing through the solar heating device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:
In the following the invention will be described with reference to the drawings in which.

DETAILED DESCRIPTION OF THE PRESENTLY PREFERRED EMBODIMENTS

A system for generating mechanical and/or electrical energy according to a first embodiment of the present invention will be described with reference to the accompanying FIG. 1(a) and (b).

Figure 1A:
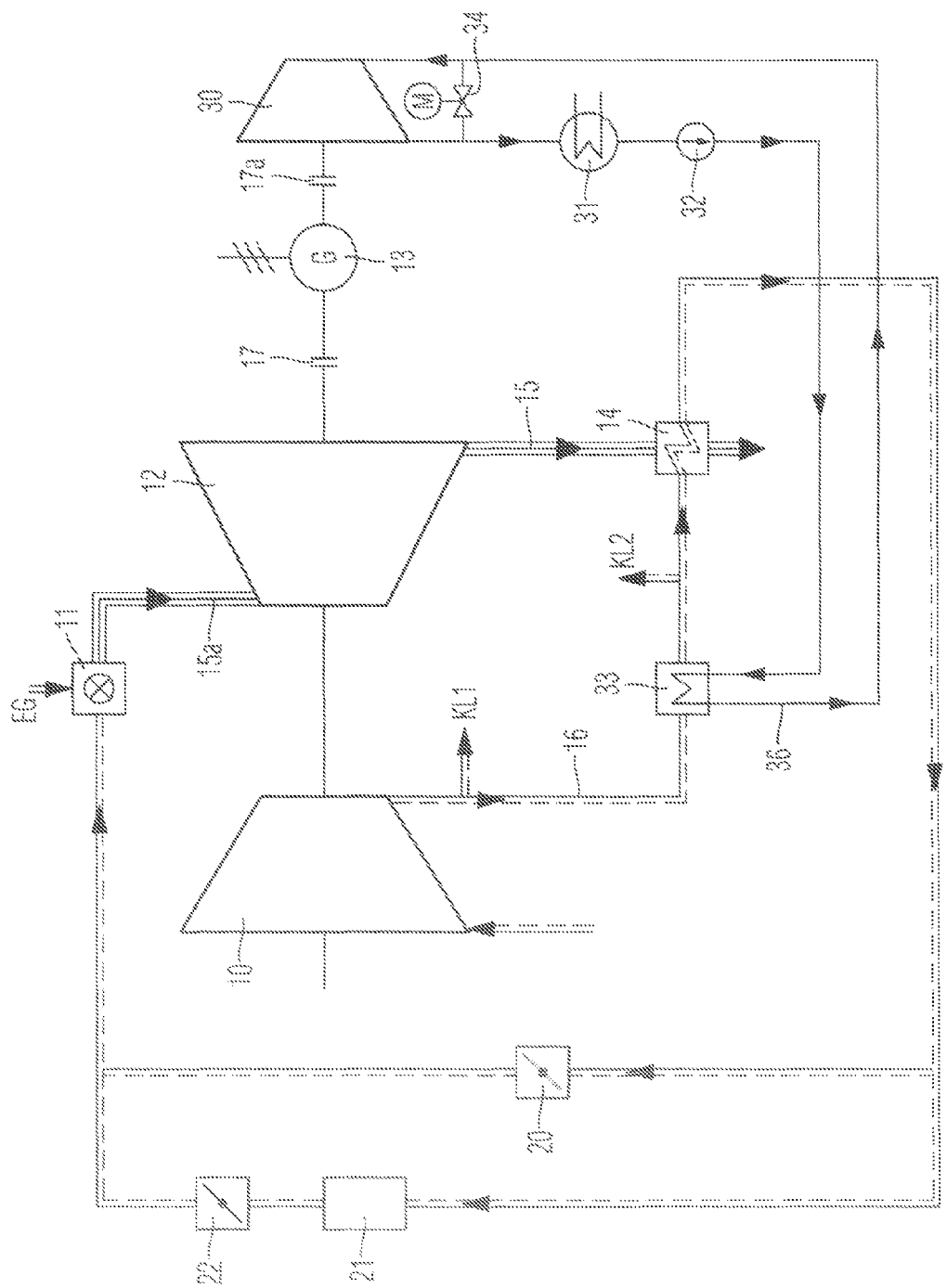
FIG. 1(a) and (b) are schematic diagrams of a first embodiment of a system according to the present invention for generating mechanical or electrical energy.
Figure 1B:
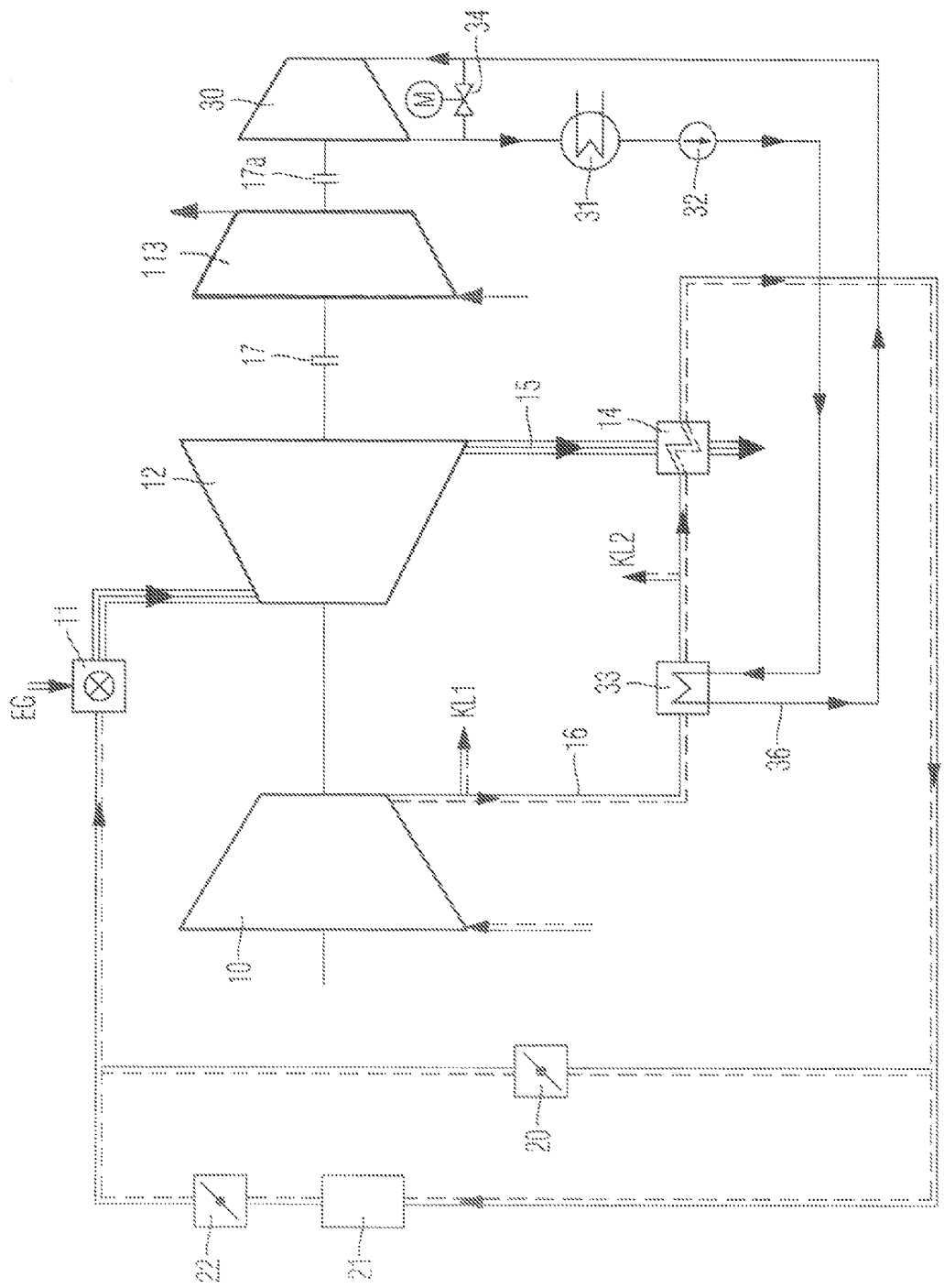

The embodiment of the present invention according to FIG. 1(a) shows the basic arrangement, according to the present invention, of the work fluid circuit 30, 31, 32, 33, 34, 36 coupled with the gas turbine plant 10, 11, 12, 15, 16, 17, 20, 21, 22 for obtaining mechanical energy for generation of electrical energy by a generator 13. FIG. 1(b) shows the same system for the generation of mechanical energy by a compressor 113.

The gas turbine plant basically comprises a compressor part 10, a burner or combustion chamber part 11, and a turbine part 12; a solar heating device 21 can be coupled in optionally via regulating devices 20, 22 for optimizing the efficiency of the gas turbine plant.

The work fluid circuit contains, e.g., $NH_3$ ammonia as work medium 36, an expander 30, a bypass device 34 for bypassing the expander 30, a condenser 31, a pump 32 for the work fluid circuit, and a heat exchanger 33.

The generation of electrical energy by means of the work fluid circuit is carried out by making use of the waste heat of the compressor air via the heat exchanger 33; in this way, the work fluid 36 undergoes an increase in temperature and arrives in the expander 30 so that the expansion occurring therein generates the mechanical energy for generation of electrical current via the generator 13. The work fluid circuit is activated again in direction of the heat exchanger 33 by the condenser 31 and the pump 32. When the temperature difference between the low-temperature work fluid 36 and the higher-temperature compressor air 16 is sufficient, the first evaporation of the work medium takes place so that the startup process of the work fluid circuit is initiated.

The compressor air 16 serves to supply the combustion chamber 11 with combustion air and, after cooling through the heat exchanger 33, is heated again by the heat exchanger 14, which is fed by the gas turbine heat 15, and can then be fed either directly to the combustion chamber 11 for combustion or the entire system can be additionally connected to a solar heating device 21; this can be controlled by regulating devices 20, 22 depending on external determining factors daytime, nighttime, sunny, cloudy. Owing to the combustion of a fuel, e.g., natural gas NG, taking place in the combustion chamber 11 with the aid of the preheated compressor air 16 which is under high pressure, a hot gas 15 having the same or higher temperature is directed to the turbine part 12 of the gas turbine plant for expansion so that mechanical energy is generated for generating electric current by means of the generator 13. In order to further reduce the amounts of cooling air, the cooling air KL can also be removed KL2 downstream of the heat exchanger 33 as an alternative to direct withdrawal KL1 downstream of the compressor part 10.

A system for generation of electrical energy according to a second embodiment of the present invention will be described with reference to the accompanying FIG. 2(a). The system for generation of mechanical energy is shown in FIG. 2(b).

Figure 2A:
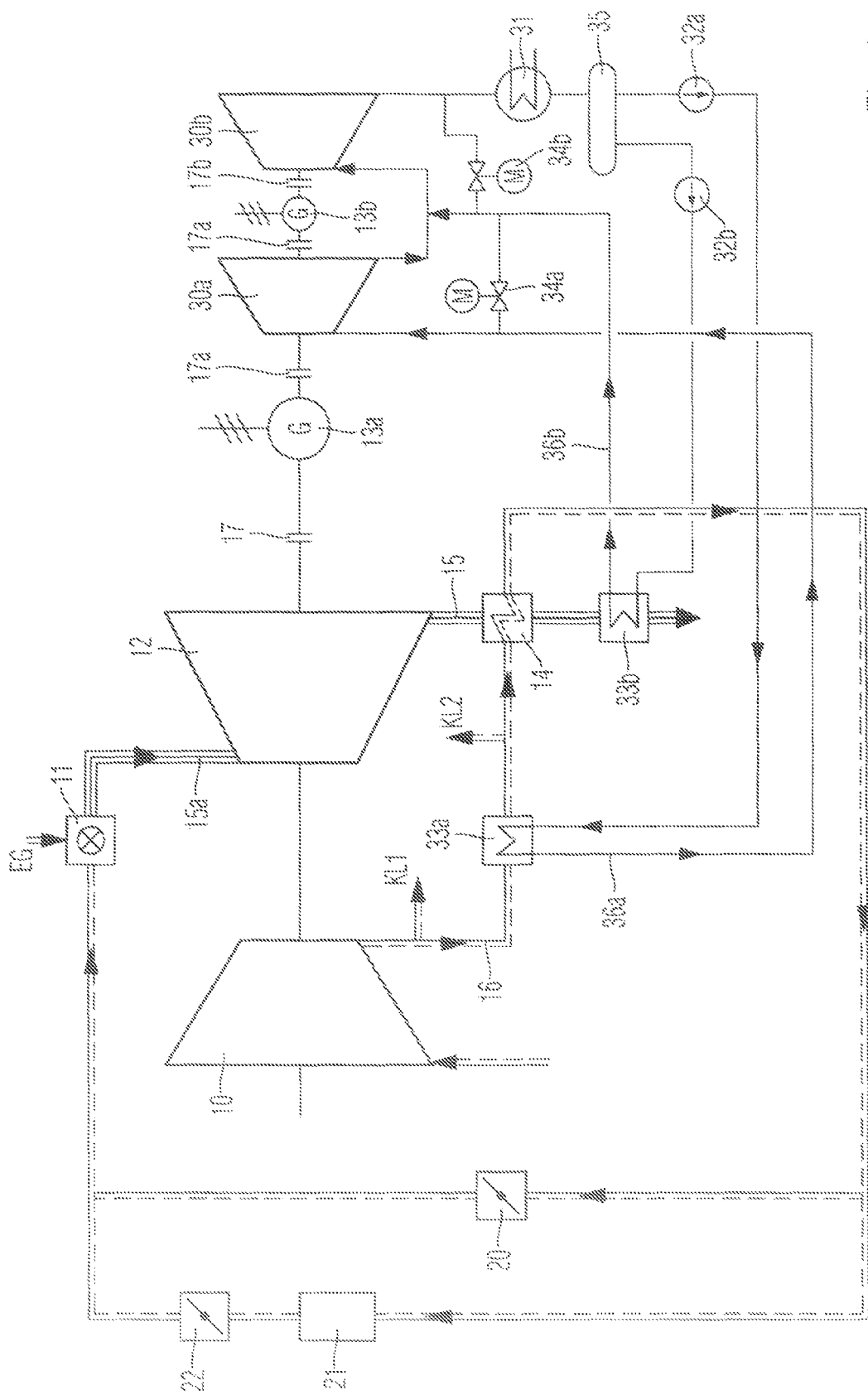
FIG. 2(a) and (b) are schematic diagrams of a second embodiment of a system according to the present invention for generating mechanical or electrical energy.
Figure 2B:
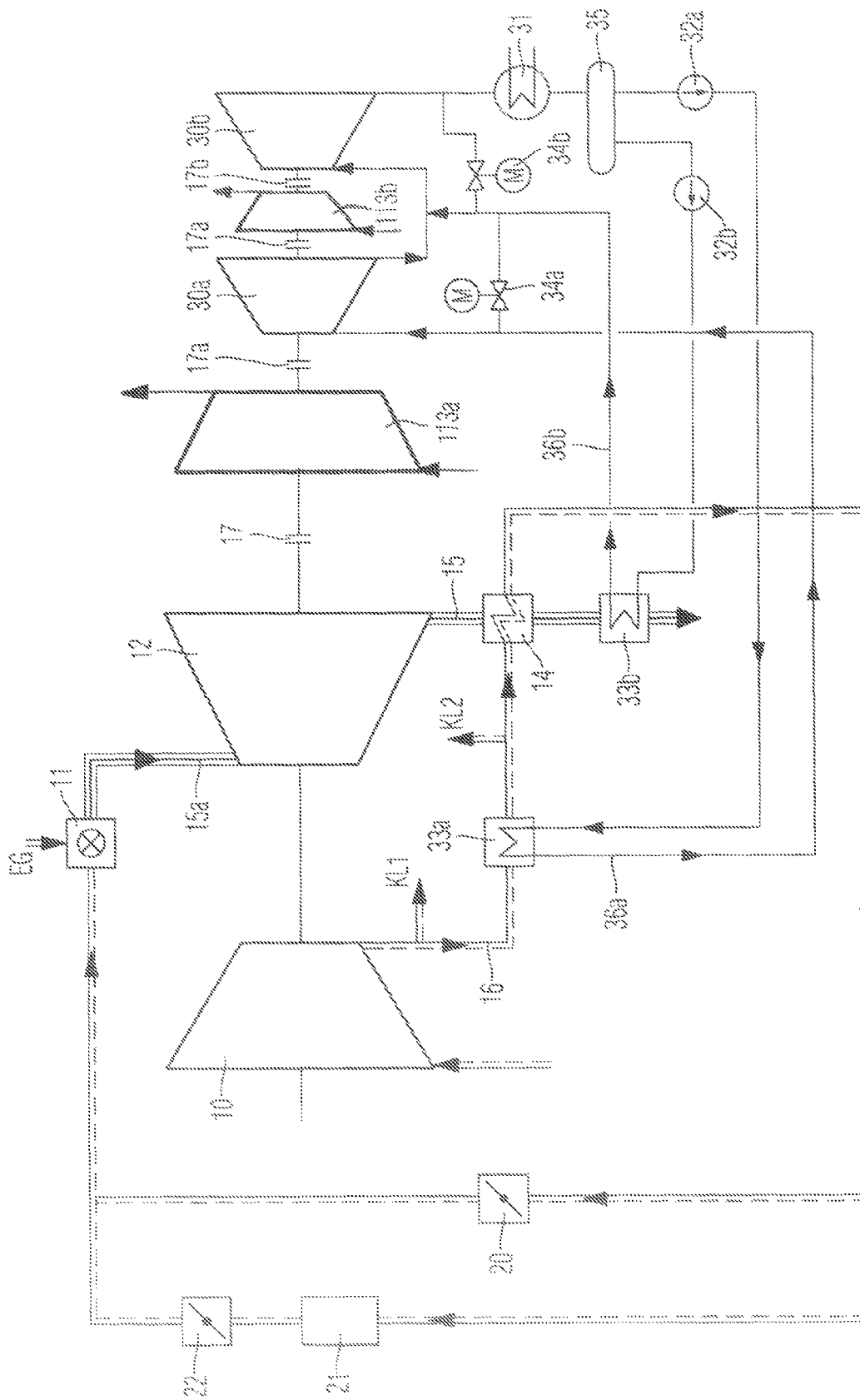

Diverging from the first embodiment, another arrangement, according to the present invention, of a work fluid circuit 30a, 30b, 31, 32a, 32b, 33a, 33b, 34a, 34b, 35, 36a,

36b coupled with the gas turbine plant 10, 11, 12, 15, 16, 17, 20, 21 22 for obtaining mechanical energy for generation of electrical energy by a generator 13b is now shown in the second embodiment of the present invention according to FIG. 2(a); however, in this case two work fluid circuits are now coupled with the gas turbine plant.

The gas turbine plant and the work fluid circuit are identical to those in the first embodiment example with regard to their basic components. Consequently, the following description concerns predominantly only the integration of the two work fluid circuits into the gas turbine plant.

The generation of electrical energy through the work fluid circuit is now carried out on the one hand by making use of the waste heat of the compressor air 16 via heat exchanger 33a and, on the other hand, by making use of the gas turbine waste heat 15 via heat exchanger 33b; thus, a distinction can be drawn between a high pressure or HP work fluid circuit and a low pressure or LP work fluid circuit.

In the HP work fluid circuit, the work fluid 36a undergoes an increase in temperature through the HP heat exchanger 33a and arrives in the HP expander 30a so that the expansion taking place therein generates the mechanical energy for the generation of electric current by means of the generator 13b or mechanical energy by components 113a and/or 113b. The expanded work fluid is then supplied to the LP work fluid circuit, described in the following, before entering the LP expander.

In the LP work fluid circuit, the work fluid 36b undergoes an increase in temperature through the LP heat exchanger 33b and, together with the expanded work fluid 36a from the HP work fluid circuit, arrives in the LP expander 30b so that the expansion taking place therein generates the mechanical energy for the generation of electric current by means of the generator 13b or the generation of mechanical energy by means of compressor 113b.

Through the condenser 31, the work fluids 36a, 36b arrive in the work fluid tank 35 and, from the latter, the two work fluid circuits are guided again in direction of the respective heat exchangers 33a, 33b by a HP pump 32a and a LP pump 32b. The HP work fluids and LP work fluids can be activated when there is a sufficient temperature difference between the low-temperature work fluids 36a, 36b and higher-temperature compressor air 16 and the gas turbine waste heat 15.

The compressor air 16 serves to supply the combustion chamber 11 with combustion air and after cooling through the HP heat exchanger 33a, is heated again through the heat exchanger 14 fed by the gas turbine waste heat 15; in so doing, the cooled amount of exhaust gas 15 from the gas turbine plant still has a temperature sufficient to keep the above-described LP work fluid circuit engaged by means of the LP heat exchanger 33b.

The reheated compressor air 16 can now be fed either directly to the combustion chamber 11 for combustion or the entire system can be additionally connected to a solar heating device 21; this can be controlled by regulating devices 20, 22 depending on external determining factors daytime, nighttime, sunny, cloudy. Owing to the combustion of a fuel taking place in the combustion chamber 11 with the aid of the preheated compressor air which is under high pressure, a hot gas having the same temperature is directed to the turbine 12 of the gas turbine plant for expansion so that mechanical energy is generated for generation of electric current by means of the generator 13.

Naturally, use of the system described in the two embodiments described above is not limited only to the use of the generated mechanical energy for generators; rather, it is also possible to integrate machines which perform work such as the compressors 113a and 113b in FIG. 2(b). In twin-shaft gas turbine plants, the mechanical driving power for the compressor part of the gas turbine plant could be used partially or entirely through the additionally generated mechanical energy of the expander, for example.

The invention is not limited by the embodiments described above which are presented as examples only but can be modified in various ways within the scope of protection defined by the appended patent claims.

We claim:

1. A system for the generation of one of mechanical and electrical energy comprising:
    a gas turbine plant comprising a compressor part (10) for compressing air to generate compressed air; a combustion chamber (11) for burning a fuel together with the compressed air to form high-energy hot gas (15a); a turbine part (12) for expansion of the hot gas (15a) and for obtaining mechanical energy for one of a compressor and a generator (13);
    a chain of units comprising a closed circuit containing a work fluid (36), at least one heat exchanger (33) for increasing the heat energy of the work fluid (36), at least one expander (30) for expanding the work fluid (36) and for obtaining mechanical energy for one of a compressor (113) and a generator (13), at least one condenser (31) for condensing expanded work medium, and at least one pump for conveying the work fluid; said first heat exchanger (33) coupling said gas turbine plant to said chain of units by being connected to said compressed air of said compressor for heating said work fluid and starting said closed circuit;
    said turbine part (12) generating waste heat (15) and said as turbine plant comprising downstream of said first heat exchanger (33) a second heat exchanger (14) fed by said gas turbine waste heat (15) for heating the compressed air of said compressor part (10) which is cooled through said first heat exchanger (33);
    said combustion chamber (11) generating a hot gas (15)a through combustion of a fuel with the compressed air of said compressor part (10); and
    said gas turbine plant additionally comprising upstream of said combustion chamber (11) a sola heating device (21) for increasing the temperature of the compressor air.

2. The system for the generation of energy according to claim 1, wherein said gas turbine plant additionally comprises at least one regulating device (20, 22) for one of at least partially coupling and uncoupling said solar heating device (21).

3. The system for the generation of energy according to claim 1, wherein said chain of units comprises at least two heat exchangers (33a, 33b); two expanders (30a, 30b); one of at least one compressor (113a, 113b) consuming mechanical energy and at least one generator (13a, (13b) generating electrical energy; at least one condenser (31); at least one work fluid tank (35); and at least two pumps (32a, 32b).

4. The system for the generation of energy according to claim 3, comprising downstream of said second heat exchanger (14) an additional heat exchanger (33b) within the chain of units for further cooling the gas turbine waste heat (15) and for simultaneously heating the working fluid (36b) for activating the closed circuit of said chain of units.

5. The system for the generation of energy according to claim 4, wherein said chain of units comprises a high pressure circuit including a high pressure heat exchanger (33a) and a high pressure expander (30b), and wherein the high pressure heat exchanger (33a) causes an increase in the heat energy of the work fluid (36a), and wherein the high pressure expander (30a) supplies mechanical energy by means of the expansion of the work fluid (36a) for driving one of a compressor (113b) and a generator (13b).

6. The system for the generation of energy according to claim 5, wherein said chain of units additionally comprises a low pressure circuit, including a low pressure heat exchanger (33b) and a low pressure expander (30b), and wherein the low pressure heat exchanger (33b) causes an increase in the heat energy of the work fluid (36b), and wherein the low pressure expander (30b) supplies mechanical energy by means of the expansion of the work fluid (36b) for driving one of a compressor (113b) and a generator (13b).

7. The system for the generation of energy according to claim 6, wherein said low pressure expander (30b) is connectable to said high pressure circuit so that, in addition to the work fluid (36b) from the low pressure circuit, the low pressure expander (30b) is also fed with the work fluid (36a) of the high pressure circuit for expansion in the high pressure expander (30a).

8. The system for the generation of energy according to claim 1, additionally comprising at least one generator and wherein said turbine part (12) is connectable to said generator so that the mechanical energy generated by the turbine part (12) is used for generation of electrical energy by said at least one generator (13, 13)a.

9. The system for the generation of energy according to claim 1, additionally comprising at least one generator (13, 13a, 13b) and wherein said expander (30, 301, 30b) is connectable to said generator so that the mechanical energy generated by the expanders (30, 30a, 30b) is used for generation of electrical energy by said at least one generator (13), (13)a, (13)b.

10. The system for the generation of energy according to claim 3, additionally comprising a coupling (17) for connecting said generator (13a) to said compressor part (10) and said turbine part (12) of said turbine plant, and additional couplings (17a, 17b) for connecting said expanders (30a, 30b) to one another.

11. The system for the generation of energy according to claim 6, additionally comprising couplings and wherein said generator is connectable by said couplings to said low pressure expander (30b) and said high pressure expander (30a) so that said high pressure and low pressure expanders (30a, 30b) both supply mechanical energy for generation of electrical energy by said generator (13b).

12. The system for the generation of energy according to claim 1, additionally comprising a point of withdrawal of cooling air KL2, said point of withdrawal KL2 being located downstream of said at least one heat exchanger (33, 33a) for further reducing the amount of cooling air.

13. The system for the generation of energy according to claim 1, additionally comprising a generator (13) and a bypass device (34) disposed within said closed circuit so that said expander (30) can be disconnected from said generator (13) in the event of malfunction of said expander (30), and said gas turbine plant can be operated through said bypass device (34).

14. The system for the generation of energy according to claim 6, additionally comprising a bypass device and a generator (13b) connectable between said high pressure expander (30a) and said low pressure expander (30b) and wherein said high pressure expander (30a) can be disconnected from said generator (13b) in the event of malfunction of the high pressure expander (30a), and said system can be operated through said bypass device (34a) by said low pressure expander (30b).

15. The system for the generation of energy according to claim 6, additionally comprising a bypass device (30b) and a generator (13b) connected between said high pressure expander (30a) and said low pressure expander (30b) and wherein said low pressure expander (30b) can be disconnected from said generator (13b) in the event of malfunction of said low pressure expander (30b) and the system can be operated through said bypass device (34b) by said high pressure expander (30a).

16. The system for the generation of energy according to claim 1, additionally comprising at least one compressor connectable to said turbine part (12) so that the mechanical energy generated by said turbine part (12) serves to drive said at least one compressor (113, 113a).

17. The system for the generation of energy according to claim 1, additionally comprising at least one compressor connectable to said at least one expander so that the mechanical energy generated by said expander serves to drive said at least one compressor (113, 113a, 113b).

18. The system for the generation of energy according to claim 3, additionally comprising a coupling (17) for connecting the at least one compressor (113a) to said compressor part (10) and said turbine part (12) of said gas turbine plant, and at least one additional coupling (17a, 17b) for connecting said expanders (30a, 30b) to one another.

19. The system for the generation of energy according to claim 6, additionally comprising at least one coupling (17a, 17b) for connecting said low pressure expander (30b) and said high pressure expander (30a) so that both supply mechanical energy for said at least one compressor (113b).

20. The system for the generation of energy according to claim 1, additionally comprising at least one compressor (113) and a bypass device (34) disposed within said closed circuit so that said expander (30) can be disconnected from said at least one compressor (113) in the event of malfunction of said expander (30), and said gas turbine plant can be operated through said bypass device (34).

21. The system for the generation of energy according to claim 6, additionally comprising a bypass device (34a) and at least one compressor (113b) connectable to said high pressure expander (30a) and wherein said high pressure expander (30a) can be disconnected from said at least one compressor (113b) in the event of malfunction of said high pressure expander (30a), and the system can be operated through the bypass device (34a) by said low pressure expander (30b).

22. The system for the generation of energy according to claim 6, additionally comprising a bypass device (34b) and at least one compressor (113b) connectable to said low pressure expander (30b) and wherein said low pressure expander (30b) can be disconnected from said at least one compressor (113b) in the event of malfunction of said low pressure expander (30b), and the system can be operated further through the bypass device (34b) with said high pressure expander (30a).

* * * * *